United States Patent
Hege

[11] 3,984,129
[45] Oct. 5, 1976

[54] RECIPROCATING PEDAL DRIVE MECHANISM FOR A VEHICLE

[75] Inventor: Douglas W. Hege, Huntington Beach, Calif.

[73] Assignee: Hege Advanced Systems Corporation, Huntington Beach, Calif.

[22] Filed: July 15, 1974

[21] Appl. No.: 488,832

[52] U.S. Cl. .............................. 280/251; 74/594.3
[51] Int. Cl.² ......................................... B62M 1/08
[58] Field of Search ........... 74/594.3, 522; 280/251, 280/255

[56] References Cited
UNITED STATES PATENTS

| | | | |
|---|---|---|---|
| 3,375,023 | 3/1968 | Cox | 280/251 |
| 3,661,404 | 5/1970 | Bossaer | 280/255 |
| 3,834,733 | 12/1972 | Harris | 280/251 |
| 3,865,366 | 2/1975 | Stantial et al. | 74/594.3 X |

*Primary Examiner*—Samuel Scott
*Assistant Examiner*—Frank H. McKenzie, Jr.
*Attorney, Agent, or Firm*—Kenyon & Kenyon Reilly Carr & Chapin

[57] ABSTRACT

A pedal drive mechanism for a are vehicle. In a preferred bicycle version, pedal lever arms Additional pivotally attached to each side of the frame near the rear wheel hub for reciprocal rotation within a limited angular sector. Downward forces exerted by a rider on the pedals are transmitted through flexible tension members on each side of the bicycle anchored either to first attachment points intermediate the ends of the lever arms or to second attachment points on the frame above the lever arms and leading around pulleys mounted at the other of the first and second points. From the pulleys each tension member leads over and around a corresponding rotary driving member that is connected through an overrunning clutch to the rear wheel. Means interconnecting the lever arms return one arm to the upper starting position while the other arm is in the downward power stroke. Manually operable control means vary the location of the first attachment points on the lever arms to change the torque delivered to the driving members for a given driving force on the pedals. Additional idler pulleys mounted at the tension member anchor points may be used to "gear up" the mechanism for higher speeds and lower output torque. Disconnect means disengage the overrunning clutches from the rear wheel hub to prevent damage to the mechanism when the bicycle is backed up.

7 Claims, 13 Drawing Figures

RECIPROCATING PEDAL DRIVE MECHANISM FOR A VEHICLE

BACKGROUND OF THE INVENTION

1. Field of the Invention

This invention relates to pedal-type drive mechanisms for vehicles such as bicycles and more particularly to vehicle drive mechanisms for converting oscillatory motion of pedal levers to intermittent unidirectional rotation of a driven wheel and including means for continuously varying the speed of rotation of the driven wheel relative to the angular rate of movement of the pedal levers.

2. Description of the Prior Art

The conventional roller chain and sprocket bicycle transmission, driven by a pair of rotary pedal cranks, was designed a century ago and has remained essentially unchanged since then except for the development of various braking and shifting-type speed changing accessories. The basic arrangement of a forward sprocket wheel driven by rotating pedal cranks and coupled by an endless roller chain to a rear sprocket wheel mounted concentrically with the hub of the rear wheel of the bicycle combines the advantages of simplicity and low friction to provide an inexpensive and efficient drive mechanism. This conventional design has at least two inherent drawbacks, however.

For one thing, rotary pedal cranks do not provide a uniformly effective conversion of the substantially linear driving force exerted by the rider into drive torque. At the top and bottom of pedal travel, drive torque is minimal and reaches a maximum value only at the midpoint of downward travel of each pedal. For another thing, the endless chain and tandem sprocket drive does not lend itself to simple continuous speed change mechanisms. For example, two speed change systems in common use are the epicyclic or planetary gear changer developed by J. J. H. Sturmey and J. Archer in the early 1900's and the derailleur, which shifts the chain from one sprocket wheel to another of different size. The Sturmey-Archer type of epicyclic gear changer is very complex and relatively fragile and difficult to maintain in adjustment. The derailleur is a simpler mechanism but requires skill to operate. In addition, since the derailleur mechanism is necessarily mounted in an exposed position next to the rear wheel hub, it is subject to damage from dirt and impact.

Other drive mechanisms for bicycles or similar pedal driven vehicles have been used. One of the earliest bicycle drives, for example, was designed by K. Macmillan about 1839. Macmillan's Hobbyhorse, as it was called, had a pair of pedal levers pivotally suspended from the steering fork tube. Connecting rods extended rearwardly to the ends of crank arms attached to each side of the rear wheel hub, thereby converting oscillatory motion of the pedal levers into rotation of the rear wheel.

A drive mechanism disclosed in U.S. Pat. No. 2,252,156 issued to J. D. Bell on Aug. 12, 1941 combines the oscillating levers and connecting rods of the Macmillan design with a conventional tandem sprocket wheel and roller chain drive. The rear end of the connecting rod is coupled to the forward sprocket wheel through a complex slide and ratchet system for converting the reciprocal linear movement of the connecting rod into intermittent unidirectional rotation of the sprocket wheel.

The American "Star" racing machine, a well known bicycle of the last century, also featured oscillating pedal levers. The levers were pivoted from rear frame extensions behind the rear wheel hub and had pedals at their forward ends pumped in an up-and-down direction by a rider seated above the rear wheel. None of the above described oscillating pedal lever drives, however, had provision for changing the speed ratio, and none has survived in present day bicycle designs, although a slight variant of the Macmillan arrangement is used extensively for pedal drive mechanisms in four-wheeled vehicles for small children.

SUMMARY OF THE INVENTION

The pedal drive mechanism of the present invention eliminates the drawbacks of the prior art designs described above by providing the reciprocal pedal motion best adapted to match the driving force available from the legs of the rider, by converting this driving force into substantially constant torque to the driven wheel over the full pedal power stroke and by permitting continuously variable output to input speed ratios over a wide range as high as 12:1. Although intended particularly for use in a bicycle, the drive mechanism disclosed in this application is adapted for use in any pedal-driven vehicle including tricycles, pedal cars, paddle wheel boats and the like, as well as for other applications suitable for a drive mechanism to convert reciprocating or oscillating motion into intermittent unidirectional rotation.

In the broadest form, the pedal drive mechanism of the present invention comprises an elongated lever arm pivotally connected to the frame of a vehicle or the like for oscillation within a predetermined angular sector and having means near its free end for receiving a driving force such as may be exerted by a rider on or in the vehicle. The force receiving means will usually be a foot pedal, but in some applications it could be a hand grip or even a crank pin for connection to a reciprocating drive from a motor or engine.

An anchor means is mounted at either one of a first attachment point on the lever arm intermediate the ends thereof or a second attachment point connected to the frame and lying approximately in the plane of oscillation of the lever and spaced to one side of the predetermined sector of oscillation. A rotatable intermediate member is mounted at the other of the first and second attachment points. That is, the anchor means may be mounted at the first attachment point and the rotatable intermediate member mounted at the second attachment point, or vice-versa.

The drive mechanism further includes means for connecting the anchor means to a rotatable driving member by way of the rotatable intermediate member for transforming a tensile force acting on the anchor means along a line from the anchor means tangent to an effective circumference of the intermediate member, in response to a driving force exerted on the force receiving means at the free end of the lever arm, into a force acting on the driving member tangent to an effective circumference thereof (i.e. into a torque tending to rotate the driving member). The driving member, in turn, is coupled through a unidirectional torque transmitting means, such as an overrunning clutch, to a driven wheel of the vehicle or its equivalent.

A preferred embodiment of the means for connecting the anchor means to the rotatable driving member by way of the rotatable intermediate member comprises an elongated flexible tension member, such as a cable, strap, or roller chain. The flexible tension member is attached to the anchor means and leads therefrom around a portion of the effective circumference of the intermediate member, which may be an idler wheel in the form of a pulley, sprocket wheel, or the equivalent. From the intermediate member the flexible tension member leads to and wraps around at least a portion of the circumference of the rotatable driving member in non-slip relation thereto.

If the tension member is a cable or strap, it can be wrapped several times around the driving member, the number of times depending on the maximum stroke of the lever arm, the relative positions of the first and second attachment points, and the circumference of the driving member, and then fastened to the member. This will insure a non-slip relation between the strap or cable and the circumference of the driving member, while at the same time allowing sufficient length of the strap or cable to unwind from the member to accommodate the maximum stroke of the lever arm. To rewind the cable or strap on the driving member upon the return stroke of the lever arm a biasing means, such as a flat spiral spring, is connected between the driving member and the frame for urging the driving member to maintain tension at all times in the flexible tension member.

If the flexible tension member is a roller chain, on the other hand, the driving member can be a sprocket wheel. In that case the chain and sprocket relation is inherently non-slip. After passing around only a portion of the circumference of the driving member, the end of the chain (leaving enough length to accommodate the full lever arm power stroke) can be connected to the frame through a biasing means, such as a coil spring, that accomplishes the same rewind function as the spiral spring described above.

Instead of using an elongated flexible tension member, an alternative embodiment of the means for connecting the anchor means to the rotatable driving member by way of the rotatable intermediate member comprises an elongated toothed rack pivotally attached at one end to the anchor means and extending tangent to the rotatable intermediate member. The intermediate member and the driving member comprise the input and output gears, respectively, of a gear train. The teeth of the rack mesh with the input gear of the intermediate member so that oscillatory motion of the lever arm relative to the frame induces reciprocal rotation of the driving member.

A major feature of the present drive mechanism is the incorporation of an attachment point connected to the frame (the second attachment point referred to above) and the spatial relation between this attachment point and the attachment point on the lever arm. The relation between the driving force input to the lever arm and the balancing tension force induced along a line between the first and second attachment points is a direct function of the ratio of the respective lever arms for the tension force output and driving force input. Moving the location of the first attachment point on the lever arm will change the lever arm ratio and possibly the tension member to lever arm angle and will change the output/input force ratio and correspondingly the output/input speed ratio.

Consequently, the basic drive mechanism of the invention becomes a variable speed drive by incorporating means for selectively moving the location of the first attachment point on the lever arm between the ends thereof.

The drive mechanism also preferably includes means for disengaging the connection between the unidirectional torque transmitting means and the driven wheel when the driven wheel is rotated backwards with respect to the frame. Without such disengagement means the oscillatory drive input system could be forced beyond the predetermined limits when the rear wheel is rotated backwards, with possible resultant damage to the drive system.

A preferred embodiment of such a disengagement means includes shaft means fixed concentrically to the hub of the driven wheel for supporting the unidirectional torque transmitting means for both rotation and axial translation with respect thereto. Means for sliding the unidirectional torque transmitting means along the shaft interconnects the shaft and the unidirectional torque transmitting means in a manner such that forward rotation of the drive member causes the interconnecting means to slide the unidirectional torque transmitting means into engagement with the hub of the driven wheel, and backward rotation of the driven wheel causes the interconnecting means to axially disengage the torque transmitting means from the hub.

The interconnecting means preferably includes a quick nut rotatably connected through a friction coupling to the unidirectional torque transmitting means and a mating threaded portion on the shaft means. Rachet means between the quick nut and the frame of the vehicle allows rotation of the nut in the forward direction but not in the reverse direction. The thread direction of the nut is such as to cause disengagement of the unidirectional torque transmitting means for the hub of the driven wheel when the driven wheel is rotated in the backward direction with respect to the frame. Subsequent forward rotation of the driving member in response to an input driving force on the pedal lever arm drives the quick nut in the opposite direction on the threaded portion of the shaft means, through the unidirectional torque transmitting means and the friction coupling, to reengage the unidirectional torque transmitting means with the hub of the driven wheel.

Finally, the drive mechanism of the invention may desirably include a drag link assembly for providing a "false neutral" position for the speed changing devive.

For simplicity, the drive mechanism of the present invention has been described above in terms of a single lever arm. In a bicycle or similar applications of the drive mechanism, it is preferable to provide a pair of pedal lever arms, one for each foot of the rider, the lever arms being driven alternately to provide continuous torque delivery to the driven wheel. In such case, the invention further includes means for interconnecting the pair of lever arms for rotating one of the lever arms in a direction to decrease the distance between the corresponding first and second attachment points when the other lever arm is rotated in a direction to increase the distance between its corresponding first and second attachment points.

Accordingly, it is a principal object of the invention to provide a pedal drive mechanism for a vehicle that combines reciprocating pedal motion, for most effective coupling to the driving forces exerted by a rider of the vehicle, with means for converting such driving forces into intermittent unidirectional torque delivered to a driven wheel.

It is a further object of the invention to provide a pedal drive mechanism for a vehicle that includes an oscillating pedal lever arm for receiving input driving forces and means for transforming tensile forces developed in response to said input driving forces, between a first attachment point on the lever arm and a second attachment point connected to the vehicle frame, into intermittent unidirectional torque delivered to a driven wheel.

It is a still further object of the invention to provide a continuously variable speed pedal drive mechanism that includes means for changing the position on an oscillating pedal lever arm of a first attachment point for a tension member extending between said first attachment point on the lever arm and a second attachment point connected to the vehicle frame, for varying the tension forces developed in the tension member in response to input driving forces exerted on the pedal lever arm.

These and other objects of the invention will be apparent from the following description of the preferred embodiments of the invention taken in conjunction with the accompanying drawings.

DESCRIPTION OF THE PREFERRED EMBODIMENTS

The several embodiments of the present invention illustrated in the drawings are all shown as variable speed drive mechanisms for a bicycle because this is the most numerous type of pedal-driven vehicle. It will be apparent from the description, however, that the principle of the invention can be adapted easily to other types of vehicles or drive applications for converting reciprocal or oscillatory motion to intermittent unidirectional rotation.

In the following description, identical or substantially similar components in the several figures will be designated by the same reference numeral for convenience.

Referring to FIGS. 1-5, a preferred embodiment of the drive mechanism is installed in a bicycle having a triangular tube frame that includes a horizontal tube 1, a seat tube 2, and a diagonal tube 3. A front wheel 4 is mounted in conventional steering forks 5 controlled through handlebars 6 by a rider seated on a saddle 7. A rear driven wheel 8 is rotatably mounted at the intersection of a pair of seat stays 9 (only one shown) extending downwardly and rearwardly, one on each side of the rear wheel 8, from the upper end of seat tube 2 and a pair of lower stays 10 (only one shown) corresponding to the chain stays of a conventional bicycle and extending rearwardly from the lower end of seat tube 2.

Figure 1:
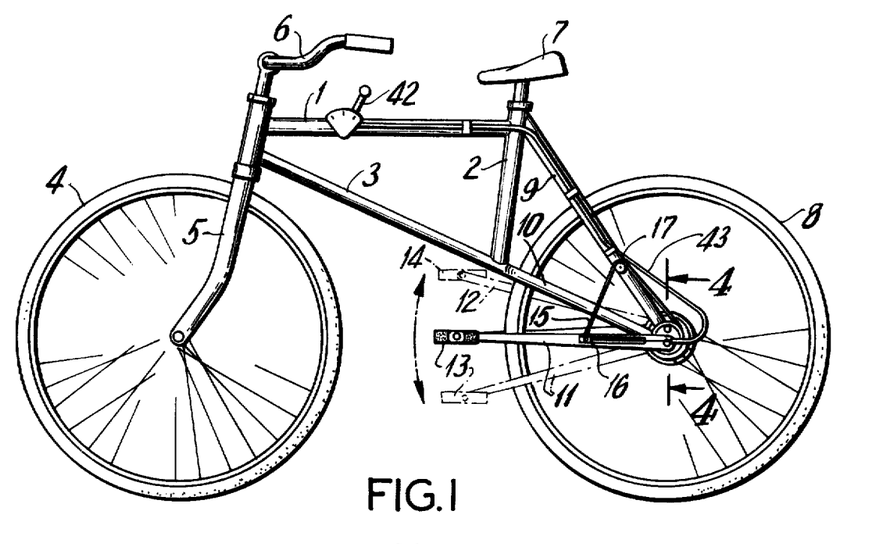
FIG. 1 is a side view of a bicycle incorporating a preferred variable speed embodiment of the pedal drive mechanism of the invention.

A variable speed drive mechanism for the bicycle preferably includes a pair of lever arms 11 and 12 pivotally mounted at the corresponding intersections of the pairs of stays 9 and 10 for oscillation within a predetermined angular sector, as denoted by the upper and lower limit positions drawn in broken lines in FIG. 1. The two lever arms preferably are interconnected by means to be described so that when left-side lever arm 11 is at the lower limit position, right-side lever arm 12 is at the upper position, and vice-versa. The lever arms have foot pedals 13, 14 attached at their respective forward ends for receiving driving forces exerted by the feet of the rider.

The upper and lower limits of lever arm travel preferably are predetermined as a function of the relative positions of the pedals and saddle for most effective utilization of the rider's leg muscles to produce maximum average driving force for the full stroke of each pedal. Stop means of conventional design (not shown) preferably are welded or otherwise attached to the bicycle frame for limiting the travel of each lever arm to the angular sector as thus determined.

Figures 2, 3:
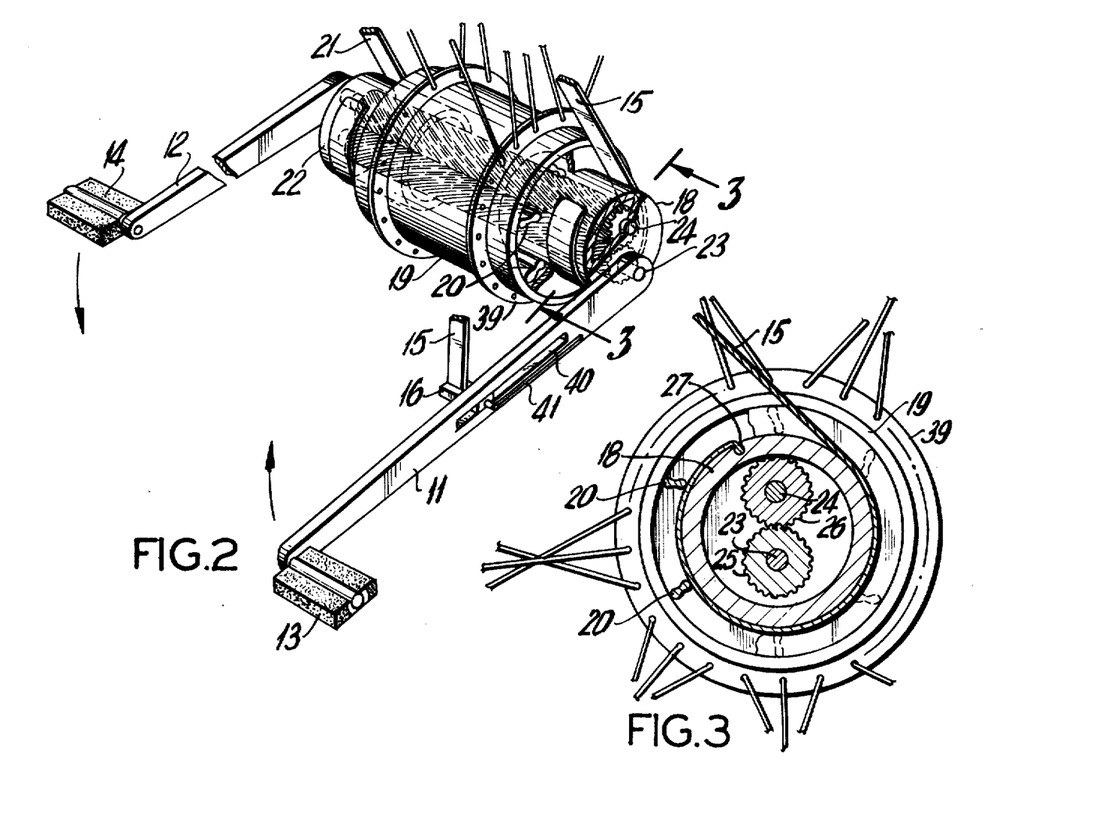
FIG. 2 is a simplified perspective view of the major components of the drive mechanism embodiment of FIG. 1.
FIG. 3 is an end view in partial section taken along the lines 3—3 of FIG. 2.

To transform the downward driving force exerted by the rider on pedal 13 of the left-hand lever arm 11 into forward torque acting on driven wheel 8, an elongated flexible tension member, such as steel strap 15, is fastened at one end to an anchor means 16 mounted at a first attachment point $a$ intermediate the ends of lever arm 11. From anchor means 16, strap 15 leads around an idler wheel 17, rotatably mounted at a second attachment point $b$ connected to the frame, and thence wraps over and around a rotatable drive member 18 that is connected to hub 19 of wheel 8 through a unidirectional torque transmitting means such as a conventional overrunning clutch incorporating sprags 20. A second flexible strap 21 is attached in identical fashion to lever arm 12 by anchor means (not shown) and leads around an identical idler wheel (not shown) to wrap around a second rotatable driving member 22 on the right-hand side of hub 19. Driving member 21 is also coupled to hub 19 through an overrunning clutch (not shown) for transmitting torque to the hub in the forward direction of rotation.

As mentioned earlier, lever arms 11 and 12 are interconnected so that downward movement of one lever arm causes upward movement of the other. In the embodiment of FIGS. 1-5, the interconnecting means includes a first shaft 23, rotatably mounted in the frame inside and parallel to the rotational axis of hub 19, and a second rotatable shaft 24, also inside hub 19 and parallel to shaft 23. Lever arm 11 is rigidly fastened to the corresponding end of shaft 23, and lever arm 12 is similarly attached to shaft 24. A first gear 25 fastened to shaft 23 meshes with a second gear 26 fastened to shaft 24, so that rotation of shaft 23 in response to downward movement of pedal 13 is translated through gears 25 and 26 into upward movement of pedal 14, and vice-versa.

The operation of this embodiment of the invention may be visualized most clearly by referring to FIG. 2, which shows a simplified perspective view of wheel hub and lever arms with all supporting structure removed. The arrow next to pedal 13 indicates that lever arm 11 is rotating downward, thereby causing shaft 23 to rotate in the forward direction (i.e. counter-clockwise as viewed in the direction of arrows 3—3). Gear 25 rotates with shaft 23; so that meshing gear 26 and its shaft 24 rotate clockwise, thereby causing lever arm 12 to rotate upwards as indicated by the arrow next to pedal 14.

At the same time, downward movement of lever arm 11 draws flexible strap 15 around idler wheel 17 and unwinds the strap from drive member 18. The other end of strap 15 is attached to the circumference of drive member 18 by any convenient means, such as by hooking the other end into an axial slot 27, so that strap 15 is wrapped around member 18 in non-slip relation thereto. Thus, a driving force exerted downward on pedal 13 by the rider creates a tension force in strap 15. The tension force, acting tangent to the circumference of drive member 18, is transformed into a torque tending to rotate drive member 18 in the forward direction. Thus forward torque, in turn, is transmitted through sprags 20 to hub 19 of the rear wheel, causing the bicycle to move forward.

As pedal 13 moves downward in its power stroke, pedal 14 returns to its upper position to be ready for the alternate driving force delivered by the other foot of the rider. A biasing means (not shown but described below in connection with FIG. 4) is connected between drive member 22 and the bicycle frame for urging the drive member to rotate in the backward direction to rewind strap 21 as lever arm 12 moves toward the upper limit position. When lever arm 11 strikes the lower limit stop, lever arm 12 reaches its upper limit, and the rider shifts his driving effort to the other leg, causing pedal 14 to move downward. Pedal 13 then returns to its upper limit through the action of the interconnecting shafts and gears. The driving cycle is then repeated.

Although the operation has been described in terms of using the full stroke available for each lever arm, it will be readily apparent that the rider can pedal the bicycle with alternating shorter strokes if he so desires. That is, it is not necessary to bring one lever arm all the way to the upper limit before its downward stroke can begin. This feature provides a significant advantage over the conventional rotary pedal crank that has a fixed path of travel. The oscillating lever drive of the present invention allows the rider to change his stroke length as he desires, depending on the bicycle speed and the slope of the terrain.

Figure 4:
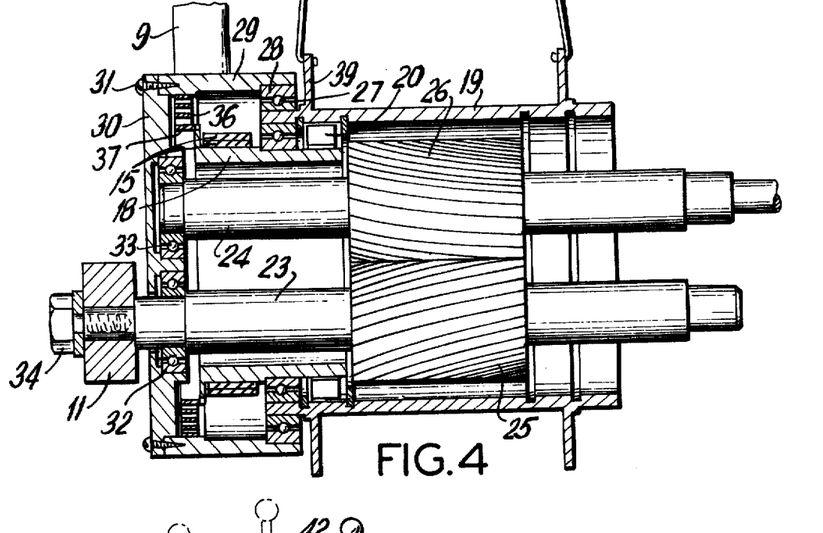
FIG. 4 is a detail drawing in partial section of the driven-wheel hub assembly taken along lines 4—4 of FIG. 1.
Figure 5:
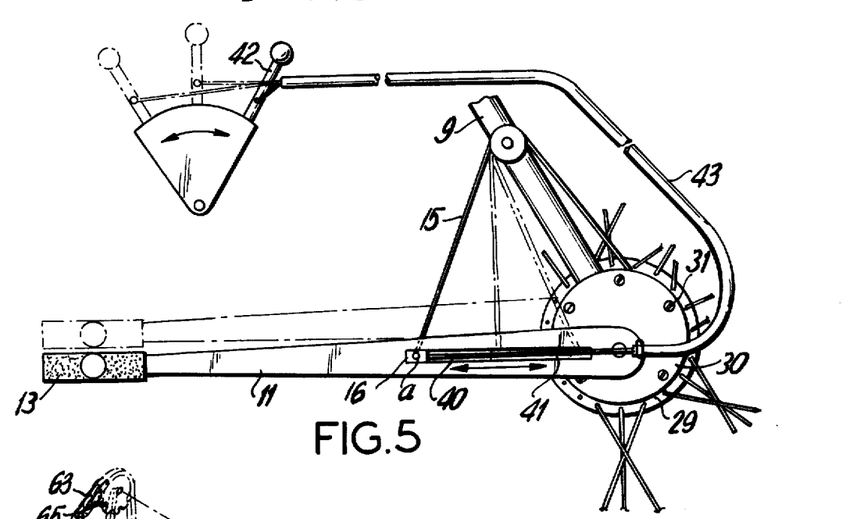
FIG. 5 is a close-up view of the drive mechanism of FIG.1 illustrating the speed changing mechanism in more detail.

The supporting structure for the operative elements of the drive mechanism that are illustrated in FIG. 2 is shown by a cross section drawing in FIG. 4 of the driven wheel hub assembly. Only the left side structure is drawn in detail; the right side is identical to the left but inverted.

Referring to FIG. 4, the outer circumference of the left end of hub 19 is supported for rotation about the hub centerline by a hub support bearing 27 mounted in a counterbored recess 28 of an open cylindrical support housing 29. Housing 29 is attached to the rear ends of left-hand stays 9 and 10 by conventional means such as welding or brazing. A cover plate 30, attached by machine screws 31 to the outer end of housing 29, is bored to receive two bearings 32 and 33 for rotatably supporting the left ends of shafts 23 and 24, respectively.

The left end of shaft 23 extends through cover plate 30, and lever arm 11 is fixedly attached thereto by any suitable means such as a mating square hole and shaft end and a bolt 34.

Cylindrical driving member 18 is supported intermediate its ends in a bearing 35 mounted inside the left end of hub 19 for rotation concentrically with the hub centerline. The inboard end of member 18 forms the inner raceway of the overrunning sprag clutch described earlier, and the outboard end of member 18 is in the form of a flanged drum for carrying the wrapped turns of tension strap 15, the strap being led through an opening (not shown) in the top of housing 29.

As previously described, a biasing means such as a spiral spring 36 is connected between the housing and the flanged end of drive member 18 for rewinding strap 15 on the drum of member 18 as lever arm 11 returns to its upper position after a downward power stroke. The connection of spring 36 between the housing and the drive member may be made in any suitable manner. For example, the outer end of the spring may be hooked and engaged in a longitudinal slot in the housing as illustrated for strap 15 in FIG. 3. The inner end of the spring may be riveted or otherwise fastened to a flat ring 37 having inboard extending protrusions (not shown) meshing with or engaging mating slots in the outer circumference of flange 38 at the outboard end of drive member 18.

A wheel spoke mounting flange 39 extends radially outward from hub 19 and serves the additional function of a dirt seal for bearing 27. Thus, all of the operative elements and support bearings are sealed inside hub 19 and housing 29, yet the drive mechanism can be easily disassembled for repair by removing cover plate 30. It will be appreciated, however, that the present invention is not limited by the specific design of the structure for supporting the operative elements, and many other arrangements could be used without departing from the scope of the invention.

In addition, although the flexible tension member of this first-described embodiment has been shown as a flat steel strap, any equivalent tension member, such as a wire cable, woven nylon strap, chain, and so forth, could be substituted, as desired. Similarly, meshing gears 25 and 26, which are shown as helical gears in FIG. 2, could also be replaced by straight spur gears or herringbone gears.

The variable speed mechanism of the first embodiment, mentioned above, is shown most clearly in FIG. 5. Anchor means 16 is slidably mounted in a slot 40 extending over a portion of the length of lever arm 11. A semi-flexible control wire 41 capable of transmitting both tension and compression forces is attached at its lower end to anchor means 16 and at its upper end to a speed control lever 42 mounted on horizontal tube 1 of the bicycle frame within handy reach of the rider.

Control wire 41 is slidably encased for the major portion of its length in a support sleeve 43 that is fixed at its upper end to the bicycle frame and at its lower end to the rear of lever arm 11. Sleeve 43 protects and guides wire 41 so that movement of speed control lever 42 forward (to the left in FIG. 5) draws anchor means 16 rearward towards the pivot point of lever arm 11, thereby reducing the speed of the driven wheel in relation to the pedal pumping speed. Conversely, pulling speed control lever 42 back to its rearmost position, as shown by the solid line position in FIG. 5, causes wire 41 to push anchor means 16 to the forward end of slot 40.

It will be understood, of course, that a similar control wire leads from speed control lever 42 to the anchor means for the right-side tension strap so that the speed ratios of both the left and right lever drives are synchronized. In fact, the left and right side drive mechanisms for all the embodiments described and shown herein are essentially mirror images of each other so that in the following discussion only one side mechanism will be described, and it will be understood that the other side operates in the same manner, bearing in mind the differences occasioned by the left and right side mirror image arrangement.

The relation between speed ratio and the position of anchor means 16 (i.e. attachment point $a$) on the lever arm is complex because it depends on two factors, both of which vary with changes in the location of attachment point $a$. The first of these factors is the ratio between the distance of pedal 13 from the pivot point of lever arm 11 to the distance of attachment point $a$ from said pivot point. The second factor is the angle between the longitudinal axis of the lever arm and the line of the tension member (e.g. strap 15) between attachment points $a$ and $b$.

Figure 6:
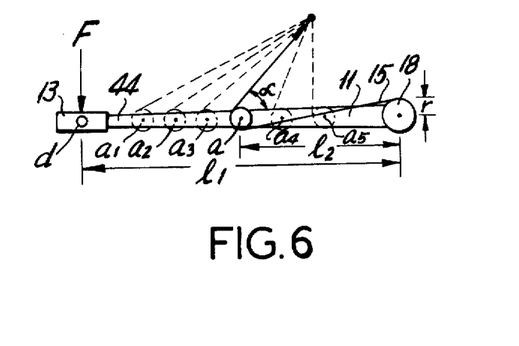
FIG. 6 is a schematic force diagram illustrating the variable speed principle of the invention.

Referring to FIG. 6, the relation between these factors is illustrated by means of a schematic diagram of the moment forces acting on a pedal lever arm 11. As shown in the figure, lever arm 11 is pivoted about a point $c$ at its right end, and a driving force F is exerted at attachment point $d$ of pedal 13 at the left end of the lever arm. The distance from point $d$ to pivot point $c$ is $l_1$, and the distance from first attachment point $a$ to pivot point $c$ is $l_2$.

FIG. 6 depicts a variant of the embodiment of FIGS. 1-5 in which idler wheel or pulley 17 is mounted at attachment point $a$, and the anchor means is located at attachment point $b$, instead of the other way around. Thus, flexible strap or cable 15 is anchored at attachment point $b$, then passes around and under pulley 17, and thence passes over and wraps around driving wheel 18 which, for simplicity, is shown mounted concentrically with pivot point $c$.

The analysis of this arrangement is the same as for the previously described embodiment in which the positions of the pulley and the anchor means are reversed, if the angle between the longitudinal axis of the lever arm and the line of cable 15 between the pulley and the drive member is negligible so that the moment force exerted by that portion of the cable on lever arm 11 can be neglected. In such case, and assuming input force F to be directed normal to the longitudinal axis of the lever arm, the relation between the input force F and the tension force T developed in cable 15 can easily be shown to be $$T = \left(\frac{l_1}{l_2}\right) \left(\frac{1}{\sin \alpha}\right) F \qquad (1)$$

where $\alpha$ is the approximate angle between the longitudinal axis of the lever arm and the line between points $a$ and $b$.

From equation (1), the torque delivered to drive member 18 becomes $$\text{Torque} = r \cdot T = r \left(\frac{l_1}{l_2}\right) \left(\frac{1}{\sin \alpha}\right) F \qquad (2)$$

where $r$ is the effective radius of the drive member. Since $l_1$ and $r$ are fixed for a particular drive mechanism, it is evident that the ratio of output torque to input force is an inverse function of both $l_2$ and $\sin \alpha$.

If the ratio of output torque to input force is defined as the mechanical advantage of the system, it is clear that the ratio of output speed to input speed varies inversely with changes in the mechanical advantage. Thus the speed ratio of the system is a direct function of $l_2$ and $\sin \alpha$.

As mentioned earlier, FIG. 6 illustrates a way to vary the speed ratio by changing the location of attachment point a on the lever arm, as from point $a_1$ through point $a_5$, while leaving point b fixed. From inspection it is clear that in moving from location $a_1$ to location $a_5$, the value of $l_2$ decreases but the value of $\sin \alpha$ increases, at least until the angle $\alpha$ reaches 90°. Consequently, the changes in the two factors tend to at least partially cancel each other, up to the position at which $\alpha$ equals 90°. Beyond that position, $l_2$ and $\sin \alpha$ both decrease as attachment point $a$ is moved toward pivot point $c$; so that the speed ratio rapidly decreases.

It is apparent from the drawing that rate of change of $l_2$ relative to the rate of change of $\sin \alpha$, as well as the direction of change of $\sin \alpha$ (whether increasing or decreasing) depends on the location of attachment point $b$ relative to the lever arm and to point $a$ on the lever. Thus by proper choice of the initial location of point $b$, the variable speed characteristic of the drive mechanism as a function of changes in the location of point $a$ can be tailored to suit various conditions of operation.

In particular, if attachment point $b$ is located a substantial distance above the pedal arm on a line approximately perpendicular to the lever arm at the midpoint of the range of movement of attachment point a, $\sin \alpha$ is approximately equal to 1 for the full range of movement of point $a$. For that special case, the speed ratio becomes a direct function of only one variable, $l_2$.

The foregoing discussion suggests the potential for wide variations in operating characteristics of the drive mechanism of this invention by simple changes in the geometric relation between the lever arm and attachment points $a$ and $b$. To avoid excessive complication, FIG. 6 is limited to only one angular position of the lever arm, but it can be seen that angle $\alpha$ may vary substantially within the upper and lower limits of lever movement.

This potential can be utilized, for example, to provide high mechanical advantage at the upper limit, where the rider's knee is sharply bent and less force can be exerted on the pedal, and then to decrease the mechanical advantage as the pedal moves downward, and more force can be applied to the pedal. Such a characteristic results if point b is located close to the upper limit of travel and slightly offset from point a with respect to distance from the lever pivot point. Then the value of sin α is quite small when the lever arm is at the upper position, and it increases as the lever arm moves downward. The possibility for tailoring other operating characteristics will be apparent to one skilled in the art.

Figures 7, 8, 10:
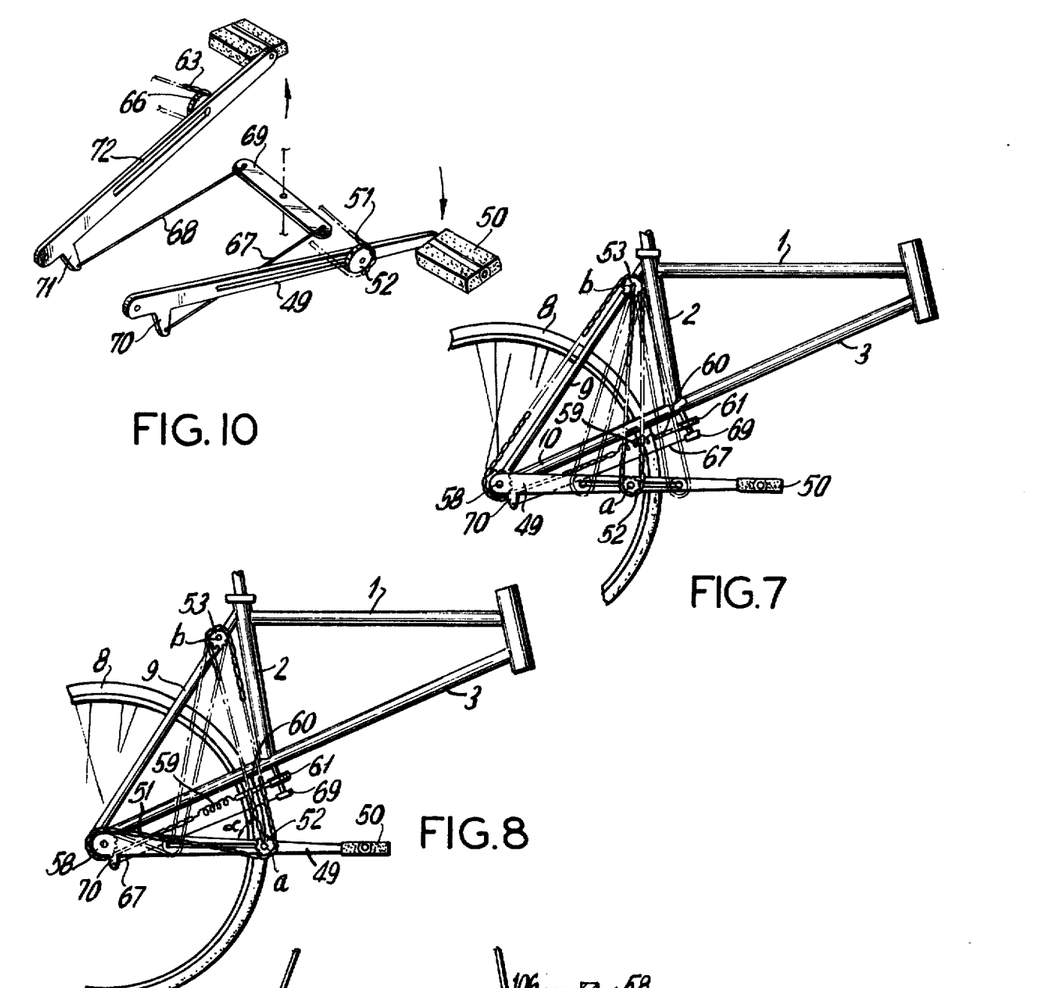
FIG. 7 is a partial side view of a bicycle incorporating an alternative speed-changing embodiment of the invention.
FIG. 8 is a partial side view of a bicycle incorporating a variant of the speed-changing embodiment shown in FIG. 7 and alternative drive chain mounting arrangement and lever arm coordinating mechanism.
FIG. 10 is a perspective view of the pedal lever arm coordinating mechanism of the embodiment shown in FIG. 8.

FIG. 7 depicts an alternative embodiment of the invention as viewed from the right side of a bicycle. In this version, as previously, a lever arm 49 is pivotally attached to the rear junction of stays 9 and 10 of the bicycle frame and carries a foot pedal 50 mounted at its forward end. A flexible roller chain 51 is attached at one end to attachement point b located near the upper end of seat stay 9. Chain 51 leads down and around an idler sprocket 52 rotatably mounted at attachment point a on lever arm 49. Instead of passing directly to the drive member after wrapping around first idler sprocket 52, however, it then leads back up and around a second idler sprocket 53 rotatably mounted at attachment point b.

After passing around idler sprocket 53, chain 51 then leads over and around a portion of a sprocket wheel 58 that forms part of a drive member and clutch combination as previously described.

This arrangement "gears up" the drive mechanism by producing twice the extension of tension member 51 for a given movement of pedal arm 49 as compared with the embodiment of FIG. 7. This doubles the speed ratio and halves the mechanical advantage for a given relative position between attachment points a and b. Alternatively, this arrangement allows attachment point a to be moved back on lever arm 49 and a corresponding shift to be made in the location of attachment point b, so that the entire speed control mechanism is more compact for a given speed ratio.

Finally, chain 51 leads forward under sprocket wheel 58 to connect to the rear end of a tension biasing spring 59. The forward end of tension biasing spring 59, in turn, is attached to a flexible cable 60 that passes around a pulley 61 rotatably mounted underneath frame member 3. The forward end of spring 59 could be attached alternatively to the frame, if desired.

Figure 9:
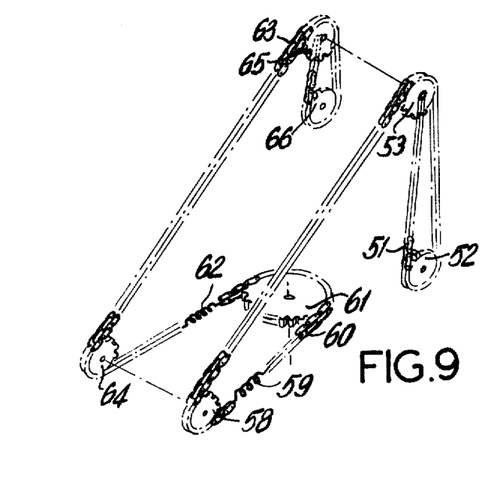
FIG. 9 is a perspective view of the drive chain mounting arrangement of the embodiment of FIG. 8.

Cable 60 and pulley 61 may be in the form of a chain and sprocket wheel, as shown in FIG. 9, which illustrates schematically the connection of the other end of cable or chain 60 on the left side of the bicycle to a corresponding bias spring 62 and tension chain 63 leading around a left-hand drive sprocket 64, forward and over an idler sprocket 65, down and under a second idler sprocket 66, then back up to terminate at the axis of idler sprocket 65.

Connecting the ends of tension chains 51 and 63 performs the rewind function accomplished by the spiral springs in the first embodiment, and coil springs 59 and 62 accommodate variations in overall length of the chain resulting from changes in the position of attachment points a on the pedal arms.

The embodiment of FIG. 7 also includes an alternative means for interconnecting the right and left-side lever arms, in place of the shafts and meshing gears of the first-described embodiment. As shown more clearly in FIG. 10, this alternative interconnecting means comprises a pair of flexible tension links 67 and 68. The links connect respective outboard ends of a bell crank member 69, mounted under pulley 61 for concentric rotation with respect thereto, to corresponding ears 70 and 71 extending from respective right and left pedal lever arms 49 and 72.

The connection point of tension link 67 to ear 70 is offset from the axis of rotation of lever arm 49 along a line perpendicular to the tension link in a direction such that downward rotation of the lever arm (i.e. in a direction to increase the distance between anchor means 52 and idler sprocket 53) causes tension link 67 to exert a pull on bell crank 69, rotating the bell crank clockwise as viewed from above. Clockwise rotation of bell crank 69 in turn induces tension in link 68, thereby causing lever arm 72 to rotate in the upward direction, as shown.

It will be apparent that the combination of a bell crank and two flexible tension links could be replaced by equivalent means, such as a single flexible tension member connected at its respective ends to ears 70 and 71 and passing around an idler pulley at the location of the bell crank. Either of these or other equivalent versions have the advantage of simplicity and low cost with respect to the shaft and gear interconnecting means, but the latter has the advantage of being totally enclosed.

Although it is not necessary that tension links 67 and 68 be flexible, it is desirable that they be so. Then tension from spring 62 can be sufficient to pull, through chains 63 and 51, both pedals into the top position when the rider's feet are not on them. This allows either pedal to be used first for power when mounting the bicycle and also raises the pedals and arms for storage when the bicycle is not in use, so that it can be laid down without damage to the pedals. Also, if the drive mechanism is not equipped with means for disengaging the overrunning clutch from the rear wheel hub when the bicycle is backed up, the connecting links will be subjected to compression forces that could bend and possibly break them if they are not flexible.

The various speed changing arrangements shown in the above figures demonstrate the design flexibility of the present invention. The geometrical relation common to all the foregoing embodiments is the provision of an attachment point a located on the pedal lever arm and an attachment point b located at a predetermined point with respect to the bicylcle frame, with means for moving attachment point a on the pedal lever arm so the product of the ratio of output to input lever arms and the sine of the angle between the lever arm and a line from point a to point b varies between predetermined minimum and maximum values.

Figure 11:
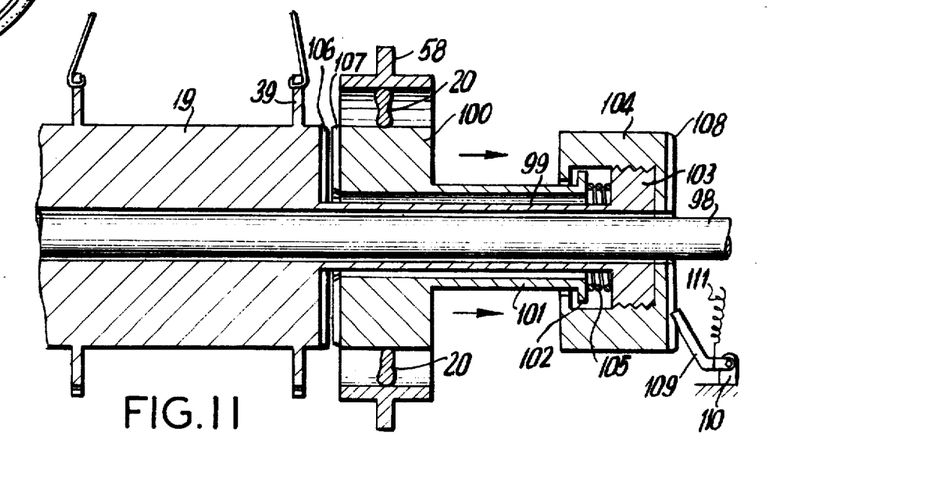
FIG. 11 is a mechanical schematic of a clutch disengagement means to prevent damage to the drive mechanism from reverse rotation of the driven wheel.

It has been mentioned earlier that preferably means should be provided to disengage the unidirectional torque transmitting means from the hub of the driven wheel when the bicycle is backed up, in order to prevent damage to the drive mechanism. A mechanical schematic drawing of a preferred disengagement means is shown in FIG. 11. Referring to this figure, a support shaft 98 is attached at either end (not shown) to the bicycle frame and carries rear wheel hub 19 rotatably mounted thereon. A shaft means 99 extends outboard from each side of hub 19 (only one side is shown; the other side is a mirror image). A unidirectional torque transmitting means, comprising an inner member 100 and a concentric outer drive member such as sprocket wheel 58, is mounted on shaft means 99 for both rotational and axial movement with respect thereto. Sprocket wheel 58 is connected through sprags 20 to inner member 100 for transmitting torque in only the forward direction to the inner member.

Inner member 100 has a cylindrical sleeve 101 extending outboard and terminating in a flanged end 102. Shaft means 99 terminates in an enlarged externally quick-threaded portion 103 which carries a mating quick nut 104 thereon, nut 104 frictionally engaging the flange portion 102 of inner member 100 as a result of axial forces exerted by a compression spring 105 placed between the inboard surface of enlarged portion 103 and the outboard surface of flange 102.

The outboard end of hub 19 and the facing inboard end of inner member 100 have matching radial serrations 106 and 107 that permit torque transmitting engagement when inner member 100 is moved axially into contact with the adjacent end of hub 19. The outboard face of nut 104 carries similar serrations 108 that are engageable by a ratchet dog 109 that is pivotally attached through member 110 to the bicycle frame and biased into engagement with the serrations 108 by a spring 111.

The operation of the drive disengagement mechanism of FIG. 11 is as follows. When the corresponding pedal lever is actuated to rotate sprocket drive member 58 in the forward direction, torque is transmitted through sprags 20 to inner member 100, rotating it also in the forward direction. The rotation of inner member 100 turns nut 104, through the frictional contact with flange 102, on threaded portion 103 of shaft means 99 in a direction to move inner member 100 axially into contact with hub 19. Torque then can be transmitted from inner member 100 through the meshed serrations to hub 19. During such forward rotation, ratchet dog 109 clicks against the serrations 108 on the outer face of nut 104.

If hub is rotated in the backward direction, however, as by backing up the bicycle, this rotation is transferred through shaft means 99 to enlarged threaded portion 103. Nut 104 is prevented from rotating with threaded portion 103 by the engagement of ratchet dog 109 with the serrations on the nut. Therefore, portion 103 will rotate inside nut 104, causing the nut to move outboard with respect to shaft means 99, thereby withdrawing inner member 100 axially out of engagement with hub 19 so that member 100 is free to rotate on shaft means 99.

It will be appreciated that a similar disengagement mechanism is mounted on the other side of hub 19. It will also be appreciated that the arrangement of the components in the disengagement means of FIG. 11 is schematic for ease of understanding and that in a practical embodiment the disengagement mechanism would be incorporated in a compact design.

For certain types of operation it may be desirable to have the speed changing mechanism include a neutral point, that is, a condition in which full motion of the pedal arm produces no change in length of the tension member and thus no forward motion of the bicycle.

A true neutral exists when attachment point b coincides with the lever arm pivot axis. However, true neutral is difficult to achieve in a practical design because of physical interference.

Figure 12:
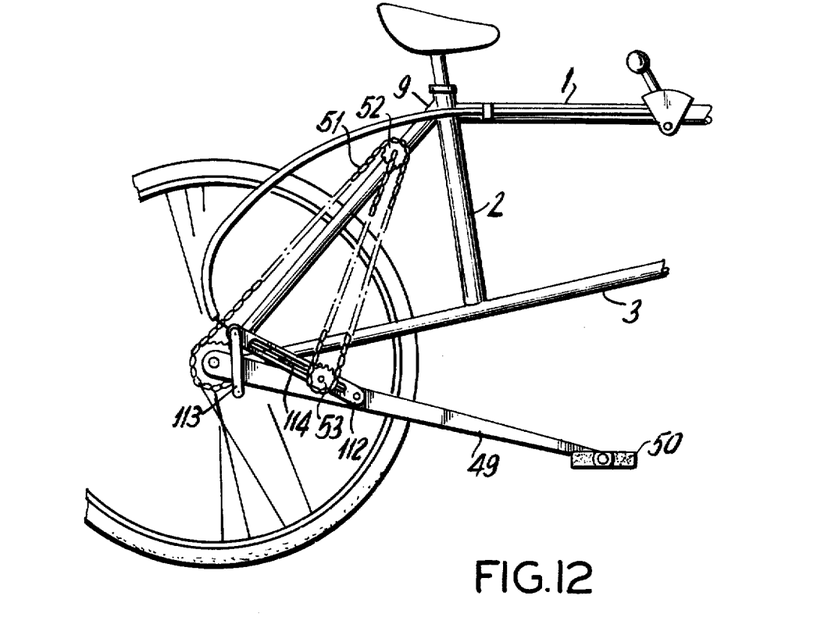
FIG. 12 is a partial side view of a bicycle incorporating a "false neutral" speed changing arrangement.
Figure 13:
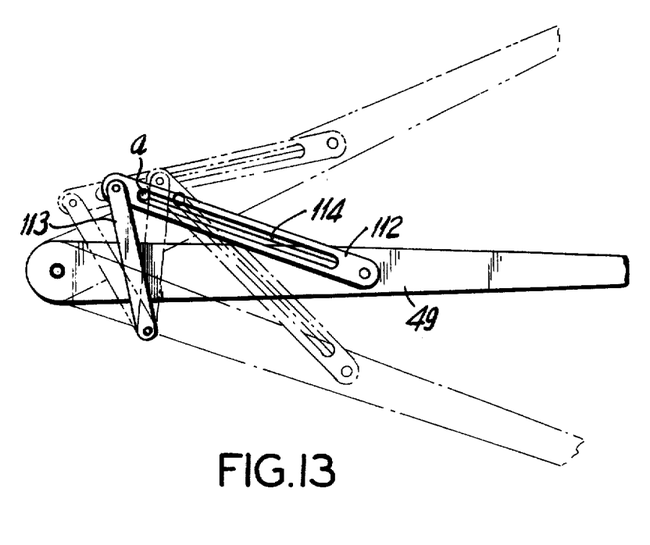
FIG. 13 is a mechanical schematic of the false neutral arrrangement of FIG. 12.

FIGS. 12 and 13 illustrate an embodiment of the invention that includes a false neutral mechanism which allows zero length change in the tension member to be obtained at a location of attachment point a that is spaced from the pivot arm axis. At the same time, the mechanism provides a smooth increase in the amount of tension member extension for a given angle of pedal arm travel as a result of movement of attachment point a from the zero position to the highest speed position.

The false neutral speed changing mechanism comprises a separate slide arm 112 pivotally attached at its forward end to a point intermediate the ends of pedal arm 49 and pivotally attached at its rear end through a link member 113 to the frame of the bicycle near, but spaced from, the pivot axis of the pedal arm. A slot 114 or equivalent means is provided in slide arm 112 for mounting idler sprocket 53 for slidable movement along the length of slide arm 112. A speed control mechanism similar to that for the embodiment of FIG. 1 permits the rider to move idler sprocket 53 for the full length of slot 114.

As shown more clearly in FIG. 13, the lengths and mounting points of slide arm 112 and link member 113 are selected so that attachment point a, when located at the rear of slot 114, describes a circular arc centered on attachment point b when pedal lever 49 oscillates through its full range. Throughout this full range, therefore, there will be no change in length of tension member 51 when attachment point a is in the rearmost zero position.

On the other hand, the "false neutral" mechanism has negligible effect on the extension of tension member 51 when attachment point a is moved to the high speed position, as shown by the solid lines in FIG. 12, and the speed ratio is continuously variable through all intermediate locations of attachment point a.

Although the embodiment illustrated in the drawings and described above demonstrate several design variations and modifications possible within the framework of the invention, it will be apparent to those skilled in the art that other variations may be made without departing from its spirit and scope.

I claim:

1. In a rider-driven vehicle having a frame and at least one driven wheel journalled in the frame for rotation with respect thereto, a drive mechanism of the type including a rotatable driving member mounted for rotation with respect to the frame and having a first predetermined effective circumference; unidirectional torque transmitting means connected between the driving member and the driven wheel for transmitting torque in only one direction from the driving member to the driven wheel; an elongated lever arm; means near one end of the lever arm for receiving a driving force exerted by a rider of the vehicle; means attached to the lever arm near its other end for connecting the lever arm to the vehicle frame to permit oscillatory movement of the lever arm about its other end within a predetermined angular sector with respect to the frame in response to the driving force exerted by the rider; anchor means mounted at one of a first attachment point connected to the lever arm intermediate the ends thereof and a second attachment point connected to the frame and lying approximately in the plane of oscillation of the lever arm and spaced to one side of the predetermined sector of oscillation; a rotatable intermediate member mounted at the other of said first and second attachment points, the intermediate member having a predetermined effective circumference; means connecting the anchor means to the rotatable driving member by way of the rotatable intermediate member for transforming a tensile force acting on the anchor means along a line from the anchor means tangent to the effective circumference of the rotatable intermediate member, in response to the driving force exerted by the rider on the force receiving means, into a force acting on the driving member tangent to its effective circumference, and means for selectively changing the location of the first attachment point connected to the lever arm so as to the vary the ratio of the force exerted by the rider to the force transmitted by the means connecting the anchor means to the rotatable driving member, the improvement wherein the means for selectively changing the location of the first attachment point with respect to the lever arm comprises:
- a slide arm having one end pivotally attached to a predetermined point on the lever arm intermediate the ends of the lever arm, the other end of the slide arm extending generally toward the rotatable driving member;
- a link member having one end pivotally attached to the frame and the other end pivotally attached to the other end of the slide arm; and
- means for moving the location of the first attachment point between predetermined limits along at least a portion of the length of the slide arm.

2. The drive mechanism of claim 1 wherein the first attachment point, when located at the one of the predetermined limits closest to the other end of the slide arm, describes an arc approximately centered at the location of the second attachment point in response to oscillation of the lever arm within the predetermined angular sector, whereby the distance between the first and second attachment points remains substantially constant for all positions of the lever arm within the predetermined angular sector.

3. A pedal drive mechanism for a wheeled vehicle of the type having a frame, at least one driven wheel journalled for rotation with respect to the frame, a pair of rotatable drive members mounted for rotation with respect to the frame; unidirectional torque transmitting means connected between each driving member and the driven wheel for transmitting torque in only one direction from the driving member to the driven wheel; a pair of elongated lever arms; a pedal attached at one end of each lever arm for receiving a driving force exerted by a rider of the vehicle; means for connecting the other end of each lever arm to the vehicle frame to permit oscillation of the lever arm about said other end within a predetermined angular sector with respect to the frame in response to the driving force exerted by the rider; a pair of anchor means, each anchor means mounted at one of a first attachment point located at a preselected position on each lever arm intermediate the ends thereof and a second attachment point connected to the frame and located at a preselected position lying approximately in the plane of oscillation of each lever arm and spaced to one side of the predetermined angular sector of oscillation; a pair of idler wheels, each idler wheel mounted at the other of said first and second attachment points; a pair of elongated flexible tension members, each tension member attached at one end to one of said anchor means and leading therefrom around the corresponding idler wheel and thence around at least a portion of the corresponding driving member in non-slip relation thereto such that rotation of the lever arm in a direction to increase the distance between the corresponding anchor means and idler wheel causes the tension member to exert a pull tangential to the driving member and thereby rotate said driving member in said one direction for transmitting torque to the driven wheel in response to said rotary movement of the lever arm with respect to the frame; and means for interconnecting said pair of lever arms for rotating one of the lever arms in a direction to decrease the distance between the corresponding anchor means and idler wheel when the other lever arm is rotated in a direction to increase the distance between the other anchor means and idler wheel in response to a driving force exerted by the rider, the improvement wherein the means for interconnecting the pair of lever arms comprises:
- a first shaft journalled in the frame and extending through the hub of the driven wheel, one of the lever arms being rigidly coupled to said first shaft for rotating the shaft with respect to the frame;
- a second shaft journalled in the frame and extending through the hub of the driven wheel parallel to the first shaft, the other of the lever arms being rigidly coupled to said second shaft;
- a first gear fastened to the first shaft inside the hub; and
- a second gear fastened to the second shaft in meshing engagement with the first gear, whereby rotation of the first shaft in one direction in response to a driving force exerted by the rider on the pedal of the one lever arm causes rotation of the shaft and the other lever arm in the opposite direction.

4. In a bicycle of the type having a frame, a steerable wheel mounted at the front of the frame, a driven wheel having a hub journalled at the rear of the frame, a seat for a rider mounted at the top of the frame, a pair of rotatable drive members mounted one on each side of and concentrically with the hub of the driven wheel for rotation with respect to the frame; a pair of unidirectional torque transmitting means connected one between each driving member and the hub of the driven wheel for transmitting torque only in the forward direction from the driving member to the driven wheel; a pair of elongated lever arms each pivotally mounted near its rear end to the frame, one on each side of and adjacent to the hub of the driven wheel, for reciprocal rotation within a predetermined angular sector having upper and lower limits respectively above and below a horizontal line extending forwardly from the pivot axis of the lever arm; a pair of pedal means attached one to each lever arm near its forward end for receiving driving forces exerted downwardly by the feet of a rider seated on the bicycle; a pair of first attachment means connected one to each lever arm intermediate the respective pedal means and pivot axis; a pair of second attachment means located one on each side of the frame above the upper limit of the predetermined angular sector of reciprocal rotation; a pair of idler wheels rotatably mounted respectively at one pair of said first and second attachment means; a pair of elongated flexible tension members, each tension member attached at one end to a respective one of the other pair of said first and second attachment means and leading therefrom around the corresponding idler wheel and thence over and around at least a portion of the circumference of the corresponding driving member in non-slip relation thereto, whereby downward rotation of the corresponding lever arm in response to a driving force exerted by a foot of the rider on the pedal thereof causes the tension member to exert a pull tangential to the corresponding driving member to rotate said driving member in the forward direction, the driving member in turn rotating the driven wheel in the forward direction through the unidirectional torque transmitting means; and means for selectively changing the location of the first pair of attachment means so as to vary the ratio of the distance from each pedal means to the rear end of the respective lever arm to the distance from each first attachment means to the rear end of the respective lever arm, whereby the ratio of the force exerted by the rider on the pedals of the lever arms to the force transmitted by the respective tension members may be varied, the improvement wherein said means for selectively changing the location of the first pair of attachment means comprises:

a pair of slide arms, each having one end pivotally attached to a predetermined point on a respective one of the lever arms intermediate the ends of the lever arm;

a pair of link members, each having one end pivotally connected to the frame of the bicycle adjacent to a respective one of the drive members and the other end pivotally connected to the other end of a respective one of the slide arms;

means for mounting each first attachment means on a respective one of the slide arms for slidable movement between predetermined limits along at least a portion of the length of the slide arm; and     control means connected to said slidable mounting means and manually operable by the rider for simultaneously sliding each of said mounting means in synchronism along the portion of the length of the respective slide arm between said predetermined limits.

5. The pedal drive means of claim 4 wherein each first attachment means, when located at one of the predetermined limits of movement along the respective slide arm, describes an arc approximately centered at the location of said second attachment means in response to oscillatory movement of the respective lever arm within the predetermined angular sector, whereby the length of the tension member between the first and second attachment points remains substantially constant for all positions of the lever arm within the angular sector.

6. The pedal drive mechanism of claim 4 further comprising means for disengaging the connections between the rotary drive members and the hub of the driven wheel, said disengagement means including:

shaft means fixed concentrically to the hub of the driven wheel and extending outboard from each side thereof for supporting the pair of unidirectional torque transmitting means, one on each side of the hub, for both rotation and axial translation with respect thereto;

means for interconnecting said shaft means and each unidirectional torque transmitting means for sliding each unidirectional torque transmitting means axially inboard into contact with the corresponding side of the driven wheel hub when the driven wheel rotates in the forward direction and for sliding each torque transmitting means axially outboard out of contact with the corresponding side of the driven wheel hub when the driven wheel rotates in the backward direction with respect to the frame, the unidirectional torque transmitting means rotating freely on said shaft means when out of contact with the corresponding side of the hub; and     mating engagement means on the contact surfaces of the hub and respective unidirectional torque transmitting means for transmitting torque to the hub in the forward rotational direction when the unidirectional torque transmitting means are in contact with the corresponding sides of the hub.

7. The pedal drive mechanism of claim 6 wherein the means for interconnecting said shaft means and each unidirectional torque transmitting means comprises:

a portion of the shaft means having a quick male thread;

a mating quick-threaded nut engaging the quick-threaded shaft portion;

means for frictionally coupling the nut to the respective unidirectional torque transmitting means, said frictional coupling means permitting limited torque to be transmitted from the coupling means to the unidirectional torque transmitting means; and     ratchet means located between the quick nut and the frame of the vehicle for preventing reverse rotation of the nut with respect to the frame, the thread direction being such as to cause disengagement of the respective unidirectional torque transmitting means from the mating engagement means on the hub of the driven wheel when the hub is rotated in the backward direction with respect to the frame.

* * * * *